Oct. 24, 1967   D. D. SMITH   3,348,505
EARTH WORKING AND PLANTING APPARATUS
Filed March 22, 1965   3 Sheets-Sheet 2
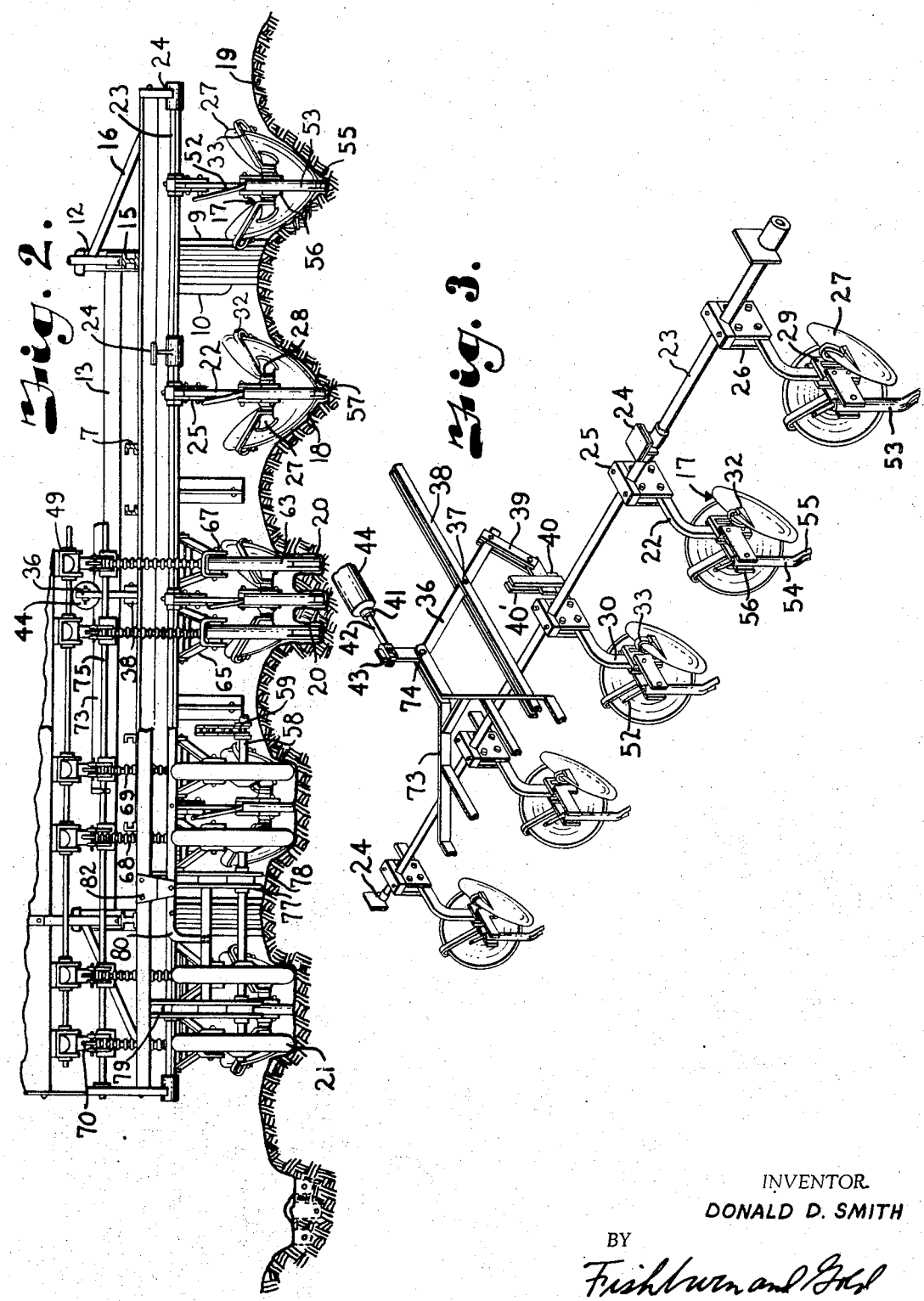
INVENTOR.
DONALD D. SMITH
BY
Fishburn and Gold
ATTORNEYS Oct. 24, 1967  D. D. SMITH  3,348,505
EARTH WORKING AND PLANTING APPARATUS
Filed March 22, 1965  3 Sheets-Sheet 3
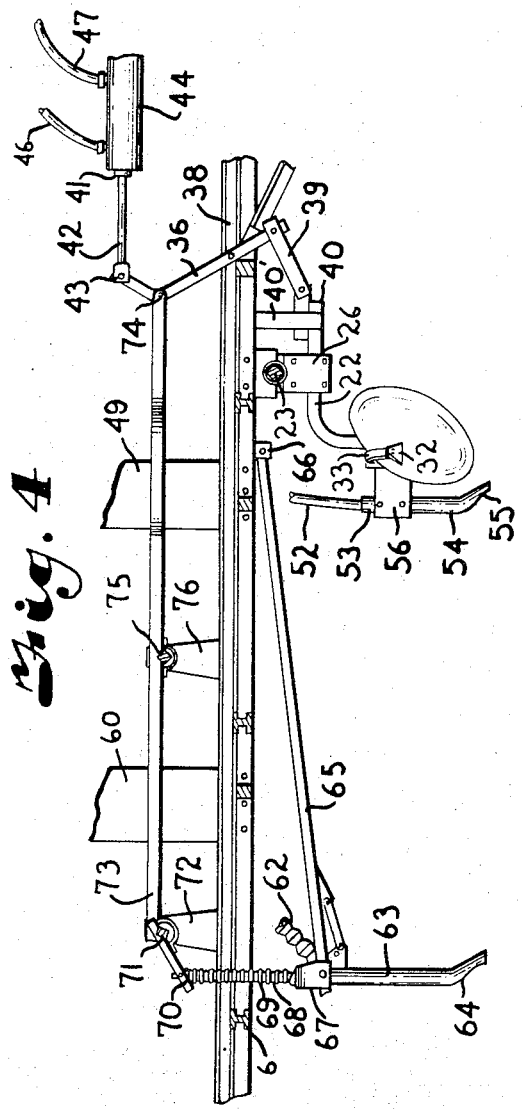
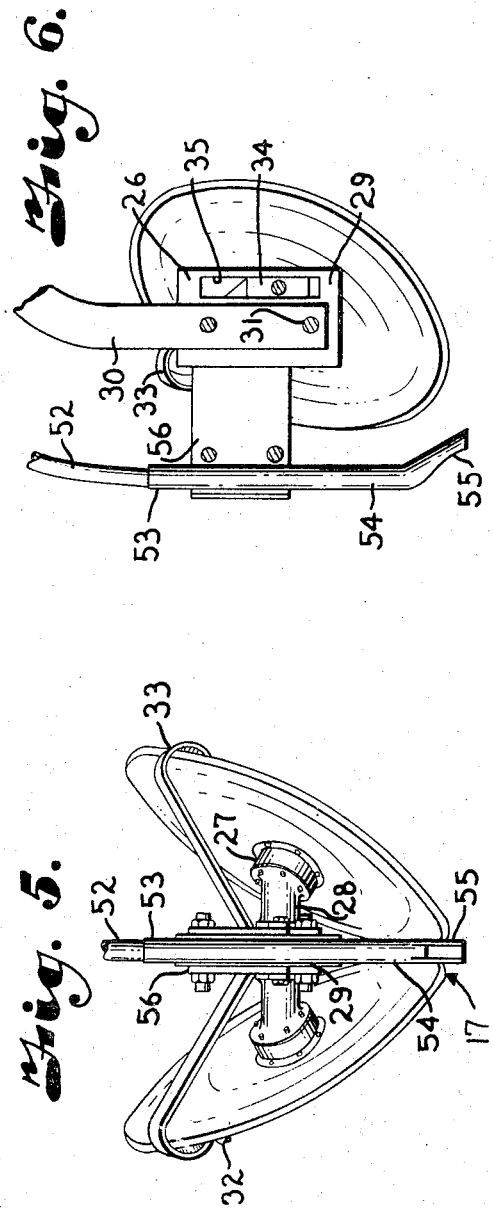
INVENTOR.
DONALD D. SMITH
BY
Fishburn and Gold
ATTORNEYS

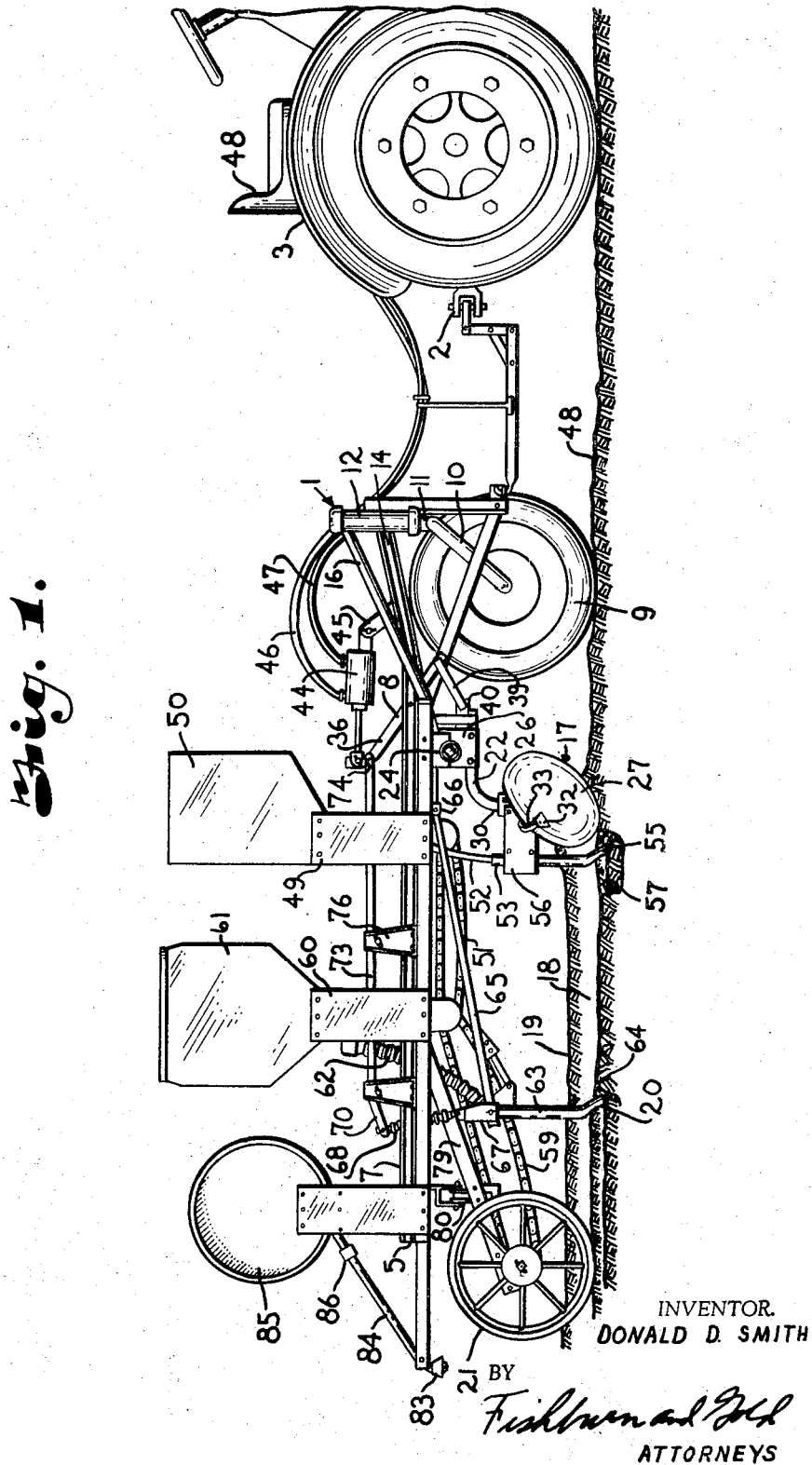

United States Patent Office

3,348,505
Patented Oct. 24, 1967

3,348,505
EARTH WORKING AND PLANTING APPARATUS
Donald D. Smith, 1155 W. 2nd, Colby, Kans. 67701
Filed Mar. 22, 1965, Ser. No. 441,684
5 Claims. (Cl. 111—73)

ABSTRACT OF THE DISCLOSURE

An earth working and planting apparatus for preparing and planting soil and having a mobile frame designed to be connected to a tractor, with a plurality of standards mounted thereon and depending therefrom, said standards having pairs of forwardly converging discs journalled thereon with each pair forming a furrow with ridges on each side. Seed furrow opening shoes are mounted in depending relation to the frame and rearwardly of the discs, there being one such shoe for each disc with seed dispensing mechanism associated with the shoes to place seed in the seed furrows. Fertilizer furrow opening shoes are mounted in depending relation to the frame rearwardly of the pairs of discs and fertilizer dispensing mechanism associated with the shoes to place fertilizer in the fertilizer furrows. Press wheels are connected to the frame so as to support the rear of the frame and laterally spaced so that there is one press wheel for each seed furrow. Weed killing preemergence spraying mechanism is mounted on the frame having controlled spray nozzles to spray the soil surface. Power means is operative to raise and lower the pairs of discs, the seed furrow opening shoes and the fertilizer furrow opening shoes, said power means being operatively connected to the tractor.

---

Heretofore, improved methods and machinery have saved labor in preparing the soil for seeding and in cultivating for the control of weeds. However, with such equipment, it has been necessary to plow and till the soil and thereafter to go over the tilled soil with a planter for planting seed in the rows and thereafter introduce fertilizer and spray for any weed control. It has been common practice to plant crops such as milo, corn, and the like in rows from 20 to 42 inches apart so there would be room to cultivate between the rows to maintain weed control. In irrigation farming, a furrow has been formed between the rows for irrigation water after several cultivations have been made. This method of farming requires a substantial number of operations after the seed planting to control weeds. It has been found that a higher yield of milo and other small grain can be had if the seeds are planted with greater spacing in the rows with the rows closer together. In other words, the same quantity of seeds is spread in two rows instead of all of the seed in one row. The plant population can remain the same and the seeds spread in two rows to cut down on the plant competition that exists when all in a single row.

The present invention contemplates a method of farming wherein furrows and ridges are formed in the soil, fertilizer is placed in the center of the furrows and rows of seeds are planted at each side of the furrow. The seeds are covered and then pre-emergence weed killing chemical is sprayed on top of the ground to provide a weed control. This planting is done in the spring and the crop would normally not need another operation until harvest except for watering. This method can save at least five operations.

The principal objects of the present invention are to provide a mobile apparatus to form furrows with ridges therebetween wherein each furrow is formed by a pair of discs and rearwardly thereof are slit opening means cooperating with a seed dispenser for depositing seed in rows, there being one row for each disc; to provide such apparatus wherein the slit opening means for seed planting provides the seed rows at opposite sides of the furrow and a press wheel rearwardly of each planter means covers the seeds; to provide such an apparatus with a tractor drawn frame with the forward end supported by castered wheels and the rear by the plurality of press wheels with furrow forming discs adjustably carried thereby for varying the depth of the furrows with channel opening shoes mounted behind the discs and having communication with the fertilizer dispenser for the depositing of fertilizer in the channels formed in the furrows; to provide such an apparatus wherein the fertilizer channel forming shoe is in the center of the furrow and spaced planter shoes form channels at the sides of the furrow and have communication with seed dispensing mechanisms for depositing seeds in said seed rows with the press wheels being in alignment with the respective planter shoes to effect covering of the planted seeds; to provide such a structure wherein a pre-emergence weed killing chemical tank is carried by the frame adjacent to rear thereof with spray nozzles communicating with said tank for spraying of said weed killing chemical on the ground surface behind the press wheels; to provide such a structure with hydraulic means actuated from the tractor and operatively connected with a support for the discs and shoes to raise and lower same relative to the frame; and to provide an agricultural implement for working the soil providing spaced furrows therein and rows of seed at the side of the furrows with said furrows being particularly adapted for flow of irrigation water between the rows of plants growing from the seeds.

Other objects and advantages of this invention will become apparent from the following description taken in connection with the accompanying drawings, wherein are set forth by way of illustration and example certain embodiments of this invention.

FIG. 1 is a side elevation of an earth working and planting apparatus embodying the features of the present invention with a fragmentary showing of the tractor drawing same.

FIG. 2 is the rear elevation of the apparatus with portions broken away to show the spaced arrangement of the planter shoes, the discs and fertilizer shoes.

FIG. 3 is a fragmentary perspective view of the apparatus showing the arrangement of the pairs of discs, fertilizer shoes, and mounting thereof.

FIG. 4 is a fragmentary longitudinal sectional view through the apparatus showing the disc and planter shoe mountings and controls therefor.

FIG. 5 is an enlarged rear elevational view of a pair of discs and fertilizer shoe.

FIG. 6 is a vertical sectional view through the pair of discs and shoe mountings taken on the line 6 of FIG. 5.

Referring more in detail to the drawings:

The reference numeral 1 generally designates a field implement connected by a hitch to a draft device such as a tractor 3 for drawing of the implement over earth to be worked and planted. The tractor 3 is preferably of conventional type having an hydraulic system with control valves (not shown) for use in actuating power members, as later described.

The implement 1 includes a frame 5 that is elongate tranversely of the path of movement thereof which frame has a plurality of spaced transverse members 6 connected by a plurality of spaced longitudinally extending members 7 to form a relatively rigid mobile frame. In the structure illustrated, the frame has a forward extension 8 carried by laterally spaced wheels 9 rotatably mounted on arms 10 having upstanding posts 11 with axes spaced from the axis of the respective wheel and rotatably mounted in bearing members 12 whereby the wheels caster as the frame is moved over the ground. The bearing members 12 are connected by transverse frame member 13 and are at forward ends of upwardly inclined extensions 14 of longitudinally extending frame members 15 suitably secured to the members 6 of the frame 5. Also, diagonal braces 16 extend from the upper portions of the bearing members 12 outwardly to the lateral extremities of the forward end of the frame 5.

The implement includes a plurality of furrow opening devices 17 to form furrows 18 between ridges 19. It also includes seed furrow opening devices 20 to open small seed receiving furrows in the large furrow 18. A plurality of press wheels 21 are arranged rearwardly of the seed furrow opening devices 20 and arranged to cover and pack soil around the seeds, the press wheels providing the support for the rear of the frame 5.

In the structure illustrated, the furrow opening devices 17 are mounted on standards 22 carried by the frame. A transverse shaft 23 extends the width of the frame 5 and is rotatably mounted in spaced bearing members 24 secured in depending relation to the frame 5. It is preferred that the shaft 23 be polygonal in shape and mounted in bushings that are rotatably mounted in the bearing members 24. The standards 22 are secured in laterally spaced relation to the shaft 23 by clamp members 25 whereby the upper forward ends of the standards are secured between plates 26 with the standards extending rearwardly and then downwardly therefrom. The furrow opening devices shown are outwardly concave cutting discs 27 arranged on the lower rear ends of the standards 22. The discs are journalled on the standards and are inclined whereby in working the soil and forming the furrow the respective disc moves the soil outwardly and forms same in the side ridge.

It is preferred that the structure be arranged whereby there is one planting row for each disc. In the structure illustrated, the discs 27 are arranged in pairs with the discs rotatably mounted in bearing portions at the outer ends of arms 28 carried by plates 29 secured to lower ends 30 of the standards by suitable fastening devices such as bolts 31 whereby there is a disc on opposite sides of the respective standard that cooperate to form a furrow 18. Suitable scrapers 32 are arranged to scrape dirt from each of the outer faces of the discs, said scrapers being carried on arms 33 extending laterally from a block 34 adjustably mounted in a way 35 in the clamp plates 29.

The penetration of the discs into the ground being worked or the relative positioning of the discs and ground is adjusted by turning of the shaft 23 by means of a lever 36 pivotally mounted as at 37 to a frame member 38 and connected by a link 39 with an extension 40 on one of the standards' mounting members 25. While the lever 36 may be operated by manual or other suitable means, in the illustrated structure it is moved by an extensible member 41 such as an hydraulic ram having a piston rod 42 connected to the upper end of the lever 36 by means of a pivotal connection 43. The cylinder 44 of the ram is mounted on an upstanding bracket 45 carried on the forward frame extension or frame member 38. The cylinder is connected through flexible hoses 46 and 47 to a control valve (not shown) on the tractor whereby an operator in the seat 48 of the tractor 3 can selectively raise and lower the discs and adjust the depth of the furrows relative to the level 48 of the unworked ground. A stop 40' on the extension 40 engages the frame member 38 when the discs are lowered to limit the penetration into the ground.

In the illustrated implement, fertilizer is deposited behind the discs in the furrow. A conventional fertilizer dispensing mechanism 49 including a hopper 50 for containing fertilizer is mounted on the frame 5 generally above the discs or furrow opening means 17. The dispensing means 49 is driven from a chain or other suitable drive mechanism 51 as in conventional practice to discharge a measured amount of fertilizer through respective tubes 52 that have their lower ends communicating with tubular upper ends 53 of shanks 54 having fertilizer furrow opening shoes 55 on the lower ends thereof. The shanks 54 are secured to brackets 56 that extend rearwardly from the disc mounting plates 29 to position the shoes 55 centrally of the path of the discs and rearwardly and at a slightly lower level whereby the furrow 57 is opened at the center of the furrow 18 and fertilizer deposited therein. Since the fertilizer should be deposited at a rate proportionate to the movement of the implement over the ground, in the particular structure the press wheels 21 are mounted on shafts 58 and one of them is connected through a power transmission mechanism such as chains and sprockets 51 to the fertilizer dispenser mechanism to drive same. Since the shoes 55 are connected to the respective disc carrying standards, said shoes are raised and lowered with the discs in response to actuation of the hydraulic ram 41.

A conventional seed dispensing mechanism 60 is suitably mounted on the frame 5 rearwardly of the fertilizer dispenser 49. This seed dispensing mechanism includes a hopper 61 for receiving seeds to be planted. The seed dispensing mechanism is also driven from the power transmission or chain and sprocket structure 51 to dispense seeds through a plurality of flexible tubes 62 to respective hollow shanks 63 each carrying a planter shoe 64 on the lower end thereof, the shoe opening the furrow with the seeds dropping therein behind the shoe. There is one seed furrow opening device for each disc, and in the illustrated structure there are two seed furrow opening devices for each furrow so that they are laterally spaced apart and adjacent the sides of the furrow 18.

The penetration of the shoe 64 into the ground is adjustable as the planting device is mounted on the frame for raising and lowering relative thereto. In the structure illustrated, the upper end of the shanks 63 are pivotally connected to brace links 65 which have the forward ends thereof pivotally connected to the frame 5 as at 66. The shank 63 for each shoe 64 is connected to a yoke 67 which has an upstanding shaft 68 with a spring 69 sleeved thereon to form a resilient connection to a lever 70 connected to a transverse shaft 71 carried on spaced bearing supports 72. The shaft 71 is rotated by means of a connection with a bar 73 that extends forwardly and is pivotally connected as at 74 to the lever 36. The bar 73 is also provided with an intermediate support as by a shaft 75 carried by bearing standards 76 mounted on the frame between the seed and fertilizer dispensing mechanisms. With this arrangement, contraction of the hydraulic ram 41 raises the discs 27, fertilizer shoes 56 and planting shoes 64 from the ground and extension of said ram effects lowering of said devices relative to the frame and penetration into the ground.

The press wheels are carried on shafts 58 mounted in bearings 77 at the rearward end of arms 78 that have their forward ends 79 connected to the frame adjacent the seed dispensing mechanism. The arms 78 are connected to transverse members 80 pivotally mounted as at 81 on a bracket 82 carried by the rear portion of the frame 5, whereby the press wheels may change their respective elevation as in passing over uneven ground. The press wheels 21 trail in alignment with the planting shoes to aid in covering and pressing the soil around the seeds.

In this operation, it is preferred to also spray the top of the soil across the path of travel of the implement with a pre-emergency weed killer after the seeds have been covered. In the structure illustrated, there are a plurality of spray nozzles 83 mounted in laterally spaced apart relation at the rear of the frame 5 with said sprays being connected by flow lines 84 to a tank 85 supported on the frame rearwardly of the seed dispensing mechanism. A suitable valve 86 is arranged in each of the lines 84 to control the flow therethrough. It is preferred that the valves be of a solenoid-actuated type whereby they may be remotely controlled from the seat of the tractor to spray the ground as the implement moves thereover.

From the foregoing, it can be appreciated that the implement with one pass over the ground can work the soil providing the furrows between the ridges, apply fertilizer, plant seed in rows adjacent the ridges and spaced from the row of fertilizer, cover the seeds and spray the ground whereby growth of weeds is eliminated or retarded. The furrows are arranged whereby in suitable contoured or ground prepared for flow irrigation, water will flow along the furrows to provide the necessary water for the crop and except for the irrigation the crop would normally not need another operation until the harvest.

It is to be understood that while I have illustrated and described one form of my invention, it is not to be limited to the specific form or arrangement of parts herein described and shown insofar as such limitations are included in the claims.

What I claim and desire to secure by Letters Patent is:

1. An earth working and planting apparatus comprising in combination with the tractor,
   (a) a frame connected to said tractor and having laterally spaced ground engaging wheels mounted at a forward portion of the frame for supporting same, said frame being elongate transversely of the direction of travel by said tractor,
   (b) a shaft extending transversely of the frame behind said wheels and rotatable on said frame,
   (c) a plurality of standards secured to said shaft in laterally spaced apart relation and depending therefrom,
   (d) outwardly concaved cutting discs arranged in pairs on said standards, said discs being journalled on said standards and converging forwardly whereby during forward movement the respective pairs of discs will each form a furrow with ridges on each side thereof,
   (e) an extensible means mounted on said frame,
   (f) means operatively connecting the extensible means to said standard shaft whereby extension and contraction of said extensible means positions the discs and raises and lowers the discs relative to the ground,
   (g) seed furrow opening devices movably connected to the frame rearwardly of the discs, there being one of said furrow opening devices for each disc and arranged to open a seed furrow adjacent the respective side ridge,
   (h) means for adjusting the seed furrow opening devices relative to the frame, including an operative connection to the extensible means whereby the furrow opening devices are raised and lowered simultaneously with the raising and lowering of the discs,
   (i) seed dispensing mechanisms mounted on said frame, said seed dispensing mechanisms depositing seeds in the respective seed furrow behind the seed furrow opening device,
   (j) press wheels connected to the frame adjacent to the rear thereof in supporting relation thereto, there being one press wheel for each seed furrow opening device and a trailing relation thereto for covering and pressing soil around the deposited seeds,
   (k) and means for driving the seed dispensing mechanisms.

2. An earth working and planting apparatus comprising in combination with the tractor,
   (a) a frame connected to said tractor and having laterally spaced ground engaging wheels mounted at a forward portion of the frame for supporting same, said wheels being castered on said frame and free to trail in the direction of movement imparted by the tractor, said frame being elongate transversely of the direction of travel by said tractor,
   (b) a shaft extending transversely of the frame behind said wheels and rotatable on said frame,
   (c) a plurality of standards secured to said shaft in laterally spaced apart relation and depending therefrom,
   (d) outwardly concaved cutting discs arranged in pairs on said standards, said discs being journalled on said standards and converging forwardly whereby during forward movement the respective pairs of discs will each form a furrow with ridges on each side thereof,
   (e) an extensible power means mounted on said frame and selectively operable from the tractor,
   (f) means operatively connecting the extensible power means to said standard shaft whereby extension and contraction of said power means positions the discs and raises and lowers the discs relative to the ground,
   (g) seed furrow opening devices pivotally connected to the frame rearwardly of the discs, there being one of said furrow opening devices for each disc and arranged to open a seed furrow adjacent the respective side ridge,
   (h) means for adjusting the seed furrow opening devices relative to the frame, including an operative connection to the extensible power means whereby the furrow opening devices are raised and lowered simultaneously with the raising and lowering of the discs,
   (i) seed dispensing mechanisms mounted on said frame, said seed dispensing mechanisms depositing seeds in the respective seed furrow behind the seed furrow opening device,
   (j) press wheels connected to the frame adjacent to the rear thereof in supporting relation thereto, there being one press wheel for each seed furrow opening device and a trailing relation thereto for covering and pressing soil around the deposited seeds,
   (k) and means for driving the seed dispensing mechanisms.

3. An earth working and planting apparatus as set forth in claim 2 including,
   (a) fertilizer dispensing mechanisms mounted on the frame,
   (b) means for each pair of discs carried by the respective standards for opening a slit at the rear of and between said discs,
   (c) means delivering the fertilizer from the dispensing mechanisms to said slit opening means for deposit in said slit,
   (d) and means operating the fertilizer dispensing mechanism in accordance with the travel over the ground.

4. An earth working and planting apparatus comprising in combination with the tractor,
   (a) a frame connected to said tractor and having laterally spaced ground engaging wheels mounted at a forward portion of the frame for supporting same, said wheels being castered on said frame and free to trail in the direction of movement imparted by the tractor, said frame being elongate transversely of the direction of travel by said tractor,
   (b) a shaft extending transversely of the frame behind said wheels and rotatable on said frame,
   (c) a plurality of standards secured to said shaft in laterally spaced apart relation and depending therefrom,
   (d) outwardly concaved cutting discs arranged in pairs on said standards, said discs being journalled on said standards and converging forwardly whereby during forward movement the respective pairs of discs will each form a furrow with ridges on each side thereof,
   (e) an extensible power means mounted on said frame and selectively operable from the tractor,
   (f) means operatively connecting the extensible power means to said standard shaft whereby extension of said power means positions the discs in the ground and contraction of the power means raises said discs out of the ground,
   (g) fertilizer dispensing mechanisms mounted on the frame, (h) means for each pair of discs carried by the respective standards for opening a slit at the rear of and between said discs, (i) means delivering the fertilizer from the dispensing mechanisms to said slit opening means for deposit in said slit, (j) seed furrow opening devices pivotally connected to the frame rearwardly of the discs, there being one of said furrow opening devices for each disc and arranged to open a seed furrow adjacent the respective side ridge, (k) means for adjusting the seed furrow opening devices relative to the frame, including an operative connection to the extensible power means whereby the furrow opening devices are raised and lowered simultaneously with the raising and lowering of the discs, (l) seed dispensing mechanisms mounted on said frame rearwardly of the fertilizer dispensing mechanisms, said seed dispensing mechanisms depositing seeds in the respective seed furrow behind the seed furrow opening device, (m) ground engaging press wheels connected to the frame adjacent to the rear thereof in supporting relation thereto, there being one press wheel for each seed furrow opening device and a trailing relation thereto for covering and pressing soil around the deposited seeds, (n) means for driving the seed and fertilizer dispensing mechanisms including transmission means connected to one of the ground engaging wheels supporting the frame, (o) and means mounted on the rear of the frame and selectively operable for spraying pre-emergence weed spray on the ground surface rearwardly of the press wheels across the width of the path of the apparatus.

5. An earth working and planting apparatus as set forth in claim 4 wherein the weed spray means consists of a tank carried by the frame and a plurality of laterally spaced apart spray nozzles carried by the frame rearwardly of the press wheels with valve controlled flow means connecting the tank to the spray nozzles.

References Cited

UNITED STATES PATENTS

| | | | |
|---|---|---|---|
| 1,169,183 | 1/1916 | Orndoff | 172—574 |
| 2,322,332 | 6/1943 | White | 111—69 |
| 2,357,760 | 9/1944 | Peacock | 111—85 |
| 2,682,132 | 6/1954 | Marihart. | |
| 2,754,622 | 7/1956 | Rohnert | 111—85 X |
| 2,869,490 | 1/1959 | Huber et al. | 111—73 X |
| 3,122,111 | 2/1964 | Taylor | 111—85 X |

FOREIGN PATENTS 205,273   9/1959   Austria.

ABRAHAM G. STONE, *Primary Examiner.*

A. E. KOPECKI, R. CARTER, *Assistant Examiners.*